Feb. 16, 1937. J. D. WHITTAKER 2,070,700
ILLUMINATION
Filed Nov. 17, 1934  3 Sheets-Sheet 1

INVENTOR,
John D. Whittaker,
BY
ATTORNEY

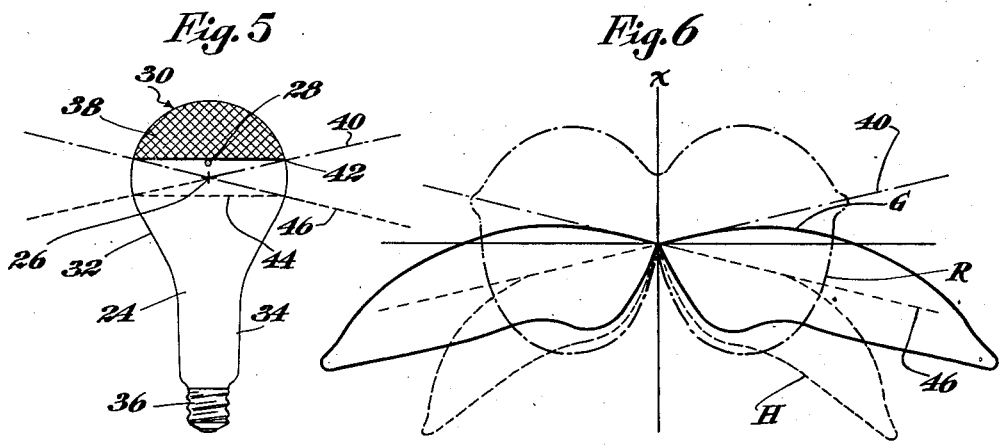
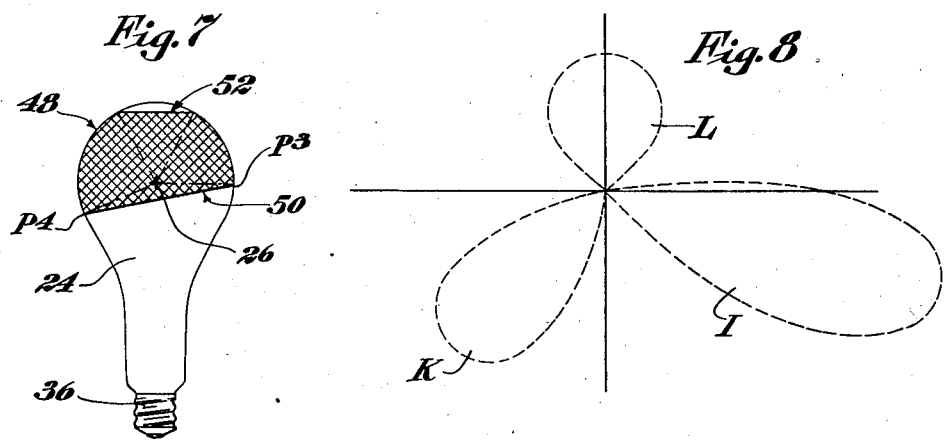
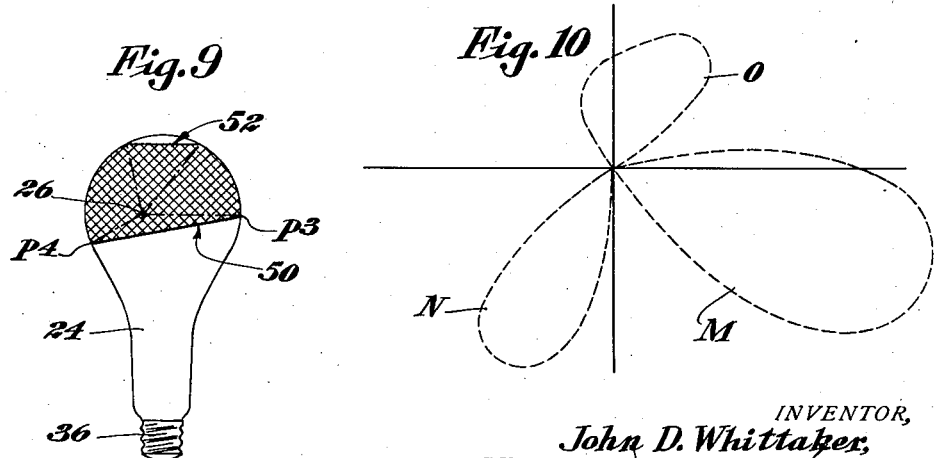

Feb. 16, 1937. J. D. WHITTAKER 2,070,700
ILLUMINATION
Filed Nov. 17, 1934 3 Sheets—Sheet 3
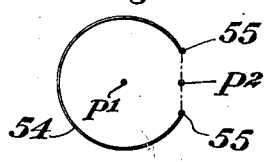
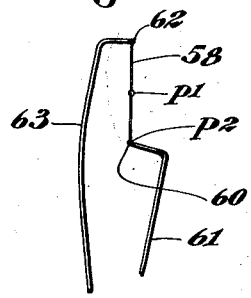
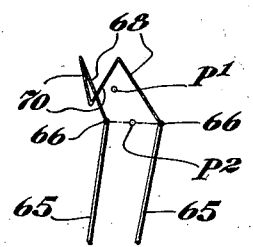
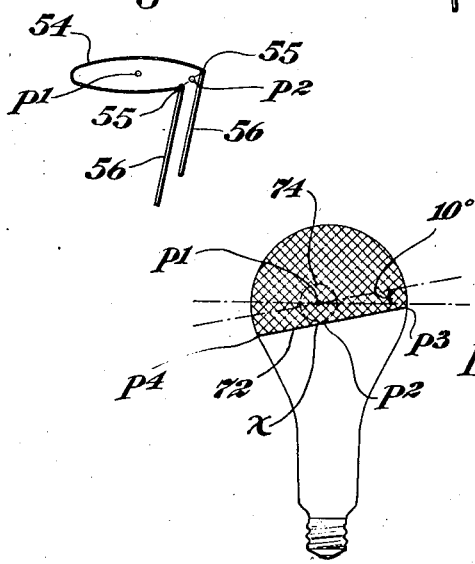
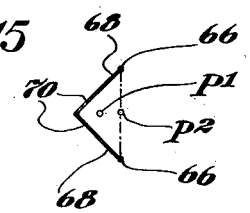
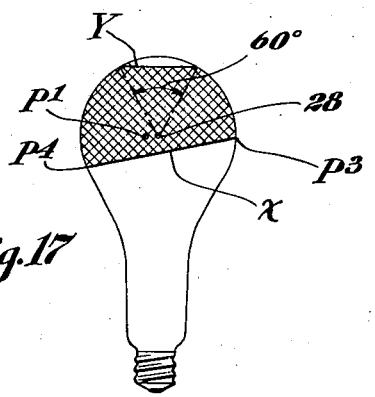
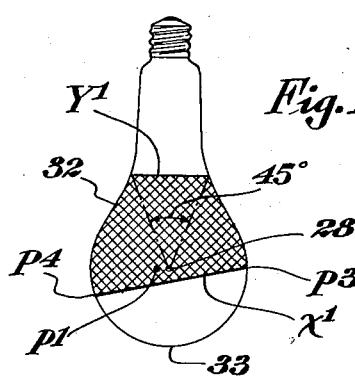
INVENTOR,
John D. Whittaker;
BY
ATTORNEY Patented Feb. 16, 1937

2,070,700

UNITED STATES PATENT OFFICE 2,070,700

ILLUMINATION

John D. Whittaker, Babylon, N. Y., assignor to Welsbach Street Lighting Company of America, Philadelphia, Pa., a corporation of Delaware Application November 17, 1934, Serial No. 753,437

14 Claims. (Cl. 176—34)

This invention relates in general to illumination and in particular to the efficient illumination of non-circular areas, and coordinately therewith it relates to a lighting unit, adapted for the attainment of such illumination, and having a light distribution that, instead of being symmetrical in relation to an axis of the unit, is asymmetric in relation thereto.

The system of illumination forming the subject of the present application is particularly useful in connection with gasoline filling stations, which, in cities, are usually in the form of rectangular areas open to the street at one side, but enclosed on the remaining three sides by buildings. It has been customary to illuminate such spaces by lighting units mounted in the middle of the space and having a light distribution symmetrical about the units, and therefore adapted for illuminating circular portions of the space, and to supplement these by units mounted at the corners, usually the corners adjacent the street so as to illuminate portions lying outside of the said circular portion. Such latter units should be designed to throw as much light as possible into the filling station space, and as little as possible in other directions. Heretofore flood lights have been employed for this purpose, with the result that the light is directed across the filling station space in a narrow beam that is usually of such a character that due to its lack of spread the light is confined to a relatively small portion of the area it is desired to illuminate and a powerful light is thrown on the adjacent buildings, and into the windows of the same, to the great annoyance of their occupants, and with the result of loss of a great proportion of the light for the purpose intended, namely, illumination only of the filling station space.

When units constructed according to the principles disclosed herein are employed, a more uniform distribution of light over the filling station space may be attained without strong illumination of the adjacent buildings, and these results are attained at relatively low operating and maintenance cost, by a simple, inexpensive construction.

In the Patents 1,891,136 and 1,891,137 to Beck and Whittaker, have been described incandescent electric bulbs, each comprising the customary incandescent filament electrically heated and a transparent casing surrounding it, in which a portion of the casing has a reflecting coating applied thereto so as to change the light distribution of the bulb in a manner calculated to attain uniformly distributed street illumination under certain conditions of use. In those patents are also described in detail the principles on which the location of the reflecting areas necessary for attaining a desired distribution of light depends.

In the practical embodiments of my invention herein disclosed, I have made use of reflecting areas applied to the surface of the casings of incandescent bulbs, and in that respect they resemble the bulbs of the aforementioned patents. However, whereas the objective aimed at in the said patents is the attainment of uniform, horizontal illumination, the main objective contemplated by me in the present application is not uniform horizontal illumination, but is the concentration of as great a portion of the light emitted by the incandescent bulb as is practical into an area eccentric to the vertical axis of the bulb, without being so much concerned with the details of the distribution, although coordinately with the concentration of the light flux, an adequate distribution is also attained.

Among the objects of my invention is therefore a method and means for the attainment of efficient illumination for non-circular areas.

Among the objects of my invention is further the provision of a lighting unit of simple construction, which, when mounted at or near the boundary of a restricted area, will distribute the light symmetrically so that the greater portion of the light will be thrown into said space and will serve for the effective illumination thereof, and only a small portion thereof will reach areas outside said space, and in particular surrounding buildings, and coordinately therewith, in a practical embodiment of my invention, the provision of means integral with an incandescent electric bulb so constructed and disposed as to effect the desired light distribution and at the same time produce a lighting unit that is practical from the standpoint of first cost and maintenance.

While I have mentioned the use of my improved bulb for use in connection with gas filling stations, it will be obvious that it may have application elsewhere, and it is to be therefore understood that I do not limit myself to the use of my bulb in connection with gas filling stations.

For the attainment of these objects and such other objects as will hereinafter appear or be pointed out, I have illustrated several embodiments of my invention in the drawings, wherein:

Figure 5 is a diagrammatic view showing an incandescent bulb such as is suitable for attaining uniform street illumination, as described in the aforementioned patents;

Figure 6 is the light distribution curve of the bulb of Figure 5;

Figure 7 is a side view of a bulb similar to that shown in Figure 5, but having the reflecting areas modified so as to give asymmetric light distribution;

Figure 8 is the light distribution curve of the bulb of Figure 7 in the plane of asymmetry;

Figure 9 is a side view of a bulb having a contour similar to the bulbs of Figures 4 and 6, but having its filament positioned and its reflecting areas distributed so as to attain the effects contemplated by my invention;

Figure 10 is the light distribution curve of the bulb of Figure 9 taken along the plane of asymmetry;

Figures 11 and 12 represent the plan and perspective view respectively of a type of incandescent filament in common use in electric illuminating bulbs, and which is adapted for use in connection with my invention;

Figure 13 is a side view of a different type of filament, also in common use;

Figures 14 and 15 are views, in elevation and in plan, respectively, of a third type of filament in common use, and suitable for use in connection with my invention;

Figure 16 is a diagrammatic view showing the geometrical relations involved in locating the reflecting areas, on a bulb such as that of Figure 9, the bulb being shown in side view;

Figure 17 is a view similar to Figure 16, showing the location of the upper edge of the reflecting area; and Figure 18 is a side view of a modified form of my invention in which the bulb is to be burned with its base uppermost, whereas, the bulbs of Figures 16 and 17 are intended to be used with their base lowermost.

Figure 1:
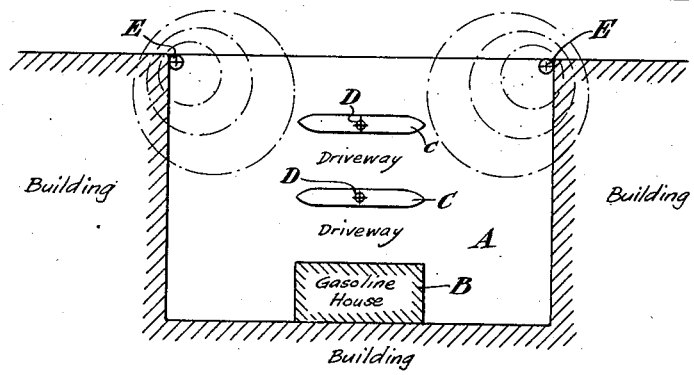
Figure 1 is a plan view of a gas filling station showing diagrammatically the use of my illuminating bulbs therein.
Figure 2:
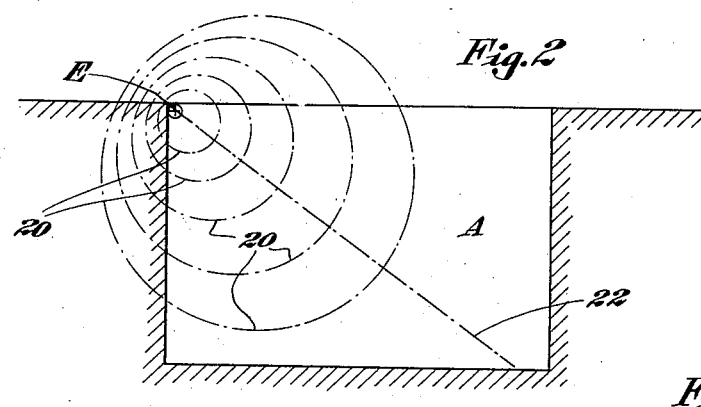
Figure 2 is a plan view showing the gas filling station of Figure 1 in dotted lines and indicating the character of distribution effected by my improved lighting unit.

Referring to the drawings in detail and in particular to Figure 1, it will be observed that I have there indicated by A the ground plan of a gas filling station, rectangular in contour, and this space is open to the street at one side, and enclosed on its three remaining sides by buildings, such arrangement being typical of gasoline filling stations located in cities. A gasoline house is indicated at B and filling platforms at C, these being spaced from each other by drive ways. Above the filling platforms C may be mounted lighting units D, having a light distribution symmetric about their vertical axes and the illumination of which will be strongest in the neighborhood of the units, that is, near the middle of the filling station space, with the result that the areas near the boundaries of the station, and particularly in the corners, are insufficiently illuminated. For the purpose of supplementing the illumination thus provided, I propose to mount at each corner of the station adjacent the street, an asymmetric lighting unit E, constructed according to my invention as disclosed herein, which will throw the greater proportion of its light inward into the space A and onto the ground, and relatively little light into the street and against the walls of the adjacent buildings. The distribution attained by my units is indicated approximately in Figure 2, wherein A indicates the gas filling station space, and in which E indicates one of my units. The lines 20, 20, are lines of equal illumination, that is, lines corresponding to the "contour" lines of a topographical map, used to indicate elevations, and it will be noted that they are symmetrical about a line 22, which is the axis of symmetry, and is the line at which the plane of symmetry cuts the ground level. It will be observed that the illumination due to the symmetrical units D is effectively supplemented by the asymmetrical units E, so as to secure adequate illumination in the corner portions of the area A. A relatively small amount of light falls outside of area A, to illuminate the street, and this portion may also be said to be effectively utilized, since illumination of the street approaches to the station is a decided asset. Another small portion of the light falls on the buildings adjacent the unit, at such an angle however, that it will not enter the windows thereof. The light thrown on the buildings at the other sides of space A is insignificant.

Figure 3:
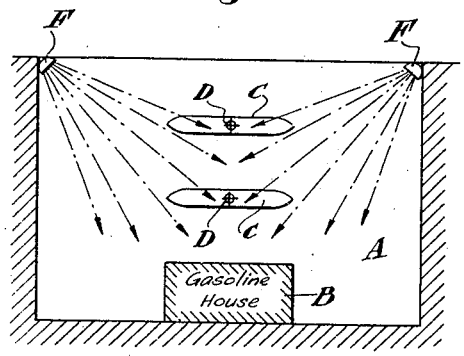
Figure 3 is a view similar to Figure 1, but illustrating the use of flood lights, such as have been heretofore used in place of my asymmetric lighting units.

In Figure 3 is indicated at 13, for purposes of comparison, the effect attained by the use of floodlights F, the narrow beams of which diverge insufficiently to reach the side and corner portions adjacent each flood-light, and which throw the light into the windows of buildings in the path of the beam. The rays of light proceeding from the floodlights may be described as more nearly unidirectional than the rays proceeding from my improved units, and therefore as being less suitable for the purposes intended.

Figure 4:
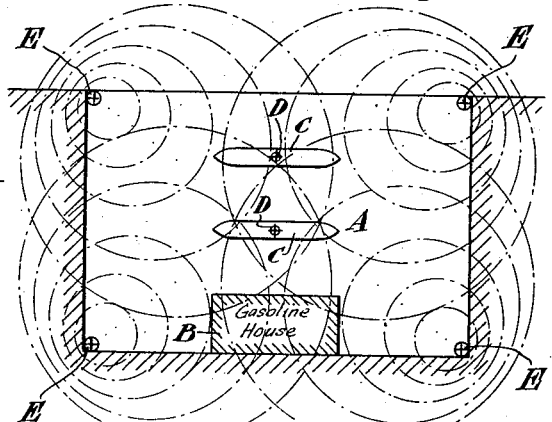
Figure 4 is a view similar to Figure 1 but showing an asymmetric unit at each of the four corners of a filling station open on all sides.

Figure 4 shows the plan of a filling station similar to that of Figure 1, in which four asymmetric units E, are used for the supplementary illumination, one at each corner of the station.

I will next proceed to explain the general considerations involved in the adaptation of incandescent bulbs to produce the effects contemplated by my invention and for that purpose will first consider a bulb having a symmetric light distribution similar to that described in the aforementioned Patent 1,891,136.

Figure 5 shows a bulb 24 of the customary pear-shaped type having an incandescent filament which for the purposes of this preliminary discussion is assumed to be point 26. Where an actual filament is in question, the point 26 would be a point about which the filament would be distributed and which may be called the equivalent center of radiation. The point 26 is located near the center 28 of the spherical portion 30 of the glass casing of the bulb, which spherical portion merges into a conical portion 32 intermediate the same and the neck 34 of the bulb. The electrical connections are effected, as customary, through the base 36 attached to the neck. Since I have illustrated my invention in all its embodiments in connection with this same type of bulb, the same system of numbering for the parts has been retained throughout the various succeeding views.

The upper portion of the spherical surface 30 of the bulb of Figure 5 is provided with a reflecting area 38 in close contact with the surface thereof and adapted to have its inner surface, that is the surface that is in contact with the bulb surface, reflect light proceeding from the filament 26 and striking it back in a downwardly direction, thereby redirecting light which would normally pass upward and be lost, onto horizontal areas below the bulb and thereby utilizing it for illumination. It is to be understood that the reflecting surfaces contemplated by my invention are such as just described, namely they reflect light emitted by the filament back toward the filament, for which reason I have referred to them in the claims as "inwardly-reflecting" surfaces in contradistinction to reflecting surfaces that might be formed on the bulb in which the free outer surface, that is not in contact with the casing, is the reflecting surface. The resulting light distribution curve is indicated in Figure 6 at G, whereas, the distribution curve for the bare lamp without the reflecting coating is indicated at R. Lines 40 drawn from the filament 26 to the edge 42 of the reflecting surface of Figure 5 indicate the limit of illumination, and these lines, drawn in Figure 6) will be tangent to the distribution curve G, assuming the filament to be actually concentrated at the point 26. It will be noted that there is a substantial proportion of the light still passing upward above the horizontal, where, of course, it will be lost for illuminating purposes. The question may now be asked why such a bulb would not be improved by extending the silvering down to the line 44, in which case the cut-off line, that is, the line marking the upper limit of the light flux, will be represented by line 46, and the distribution curve changed to the dotted curve H in Figure 6. The answer is one depending entirely upon practical considerations. Each element added to the reflecting surface introduces factors that affect the volume of light emitted from the bulb, and this, in the instant case, without increasing the efficiency of distribution, and this therefore results in a decrease of volume without any compensating advantages.

Attention may be called to the fact that the filament 26 is shown as located displaced from the center 28 of the spherical portion 30 of the bulb 28 which, of course, is also the center of the reflecting surface. This is not accidental, for the reason that coincidence of 26 and 28 is not desirable, as will be evident on considering that if these points were coincident, light reflected at the surface 30 instead of passing outwardly of the bulb would be reflected back into 26 thereby raising its temperature. By separating the points 26 and 28, however, the reflected rays pass to one side or the other of the filament 26 and outward.

The foregoing discussion, as has already been mentioned, assumes a filament which is actually concentrated in a point. To filaments such as actually used, slightly different considerations apply, since all of such filaments, instead of being concentrated in one point, are distributed. However, it is still possible for a distributed filament to have one point thereof located at the geometrical center of the spherical portion of the bulb, with the result that such filament is very apt to burn through at one place. For that reason when such filaments (such as for instance, filaments of the type of Figure 12) are used, precautions should be taken to displace them from a central position and thereby avoid the abovementioned difficulties, besides having other desirable consequences, as will be hereinafter explained.

In passing from a discussion of filaments concentrated in a point to filaments that are distributed, it must be remembered that for many purposes, certain types of distributed filaments may be considered as concentrated in a single point, which may be termed the equivalent center of radiation. Computations to determine its location would resemble similar computations for determining centers of gravity, intensity of radiation being substituted for mass. For instance, assuming that light radiation along the straight filament of Figure 13 is uniform along its length, the middle point $P^1$, would correspond to its center of radiation, and assuming a uniform mass distribution, would also be its center of gravity.

By taking point 26 in Figure 5 to represent the equivalent center of radiation of a distributed filament, each point of the light tore corresponding to curve G might be taken to represent an average or mean value of the candle power for a given direction, since in that point radiation emanations from many points of the filament meet. The departure of the actual curve from curve G may be stated to be that the inclination of line 40 will be increased, because the cut-off is now determined by rays coming from points below 26 and passing through 42, and similarly the limiting line for the lower portion of the curve will be more inclined. All abrupt changes will be evened out more or less so as to attain a more uniform distribution. In the main, however, curve G would still approximately represent the light distribution. In the following discussions therefore, the filament will be considered, for purposes of simplifying the discussion, as concentrated in a single point, the equivalent center of radiation.

It will further be noted that the distribution curves G, H and R of Figure 6 represent the intersection of a vertical plane passing through the light source, with the tores of light emitted from the light source. The light tores are surfaces or volumes of rotation generated by the curves G, H and R about the vertical axis passing through the light source, and consequently this intersecting plane may be orientated variously without changing the shape of the said curves. In other words, the light distribution is symmetrical in all horizontal planes, about the vertical axis passing through the light source.

Passing now to the characteristics of my improved lighting unit, it may be stated that the first consideration in the design of my bulb is that the light distribution must be asymmetric with reference to the vertical axis through the light source. The second consideration is that as much light as possible must be thrown into the area to be illuminated, and the third consideration is that the reflecting area must be limited to such an extent, that the life of the bulb, considering both the life of the filament and the life of the reflecting surfaces, will not be appreciably affected.

A bulb that approaches these requirements is shown in Figure 7. The reflecting area denoted by 48 has been brought lower down so that the filament 26 is now shielded by it, while at the same time the lower edge or cut off of the reflecting area has been inclined to the horizontal, as shown at 50, and in order to keep the reflecting area within the maximum permissible extent, a clear area or "window" has been provided at the uppermost portion of the bulb this window being shown by way of example, as limited by a horizontal plane 52.

A distribution curve for the bulb of Figure 7 is indicated in Figure 8. Since the distribution is no longer symmetrical, this curve represents the light distribution for only one vertical plane, and the particular plane selected is the plane of symmetry, which is the plane that divides the light tore into two portions, one of which may be described as the mirror image of the other. This plane, of course, is a vertical axial plane passing through the points $P^3$, $P^4$ of the lower edge of the reflecting surface, $P^3$ representing the highest point, and $P^4$ the lowest point of the said lower edge. The distribution curve will now have three branches, the branch I, indicating the greatest amount of light flux, in the plane of symmetry, the branch K the least amount of light flux in the plane of symmetry, and the branch L the flux which is lost upward and which it would be desirable to eliminate if that could be done as a practical matter. The curve L, which is due to the upper window, it will be noted is shown as symmetrical, which, of course, is due to the symmetrical disposition of the window.

A further refinement of construction is shown in Figure 9, in which the filament 26 has been displaced horizontally sidewise toward the point $P^4$. The effect of this on the distribution is shown on Figure 10 in which the branch M corresponding to I in Figure 8 has been increased in area, the branch N, corresponding to K of Figure 8, has been diminished in area, while the branch O corresponding to the branch L of Figure 8, while of substantially the same extent as L, has become asymmetric.

Figure 9 illustrates in substantial completeness, for one embodiment of my invention, the general disposition of the reflecting area and the filament in relation to the bulb. It remains, however, to indicate limits, both as to location and inclination, for the circle passing through the points $P^3$ and $P^4$ and bounding the reflecting area, as well as the location of the circle bounding the upper edge of said reflecting area. Moreover, since point sources of light such as indicated at 26 are not met with in practice, and each of the filaments actually used has its own peculiar characteristics, it remains to point out the particular solution of the problem for each of the most common types of commercial filaments.

In what follows as well as what has been said heretofore, I have described the lower edge of the reflecting area as a circle such as would be obtained by the intersection of an inclined plane with the bulb surface. While it is possible to obtain the effects contemplated by my invention without having such a circular boundary, such a construction has many advantages. For instance, such circular boundary gives the shortest possible length for the edge of a reflecting surface of given area, and the advantage of this will be obvious when it is recalled that peeling of reflecting coatings such as coatings of metal, such as silver, almost always starts at the edges of the surface, and rarely ever at the interior portions thereof. The tendency to peel is also lessened by the absence of projecting portions at which peeling might start. There are further to be considered the relative simplicity of manufacture and calculation in relation to such a circular boundary. The same considerations of course apply to the upper boundary 52 defining the light-transmitting window at the top of the bulb.

Representative types of filaments will now be discussed, from aspects relating to their use in connection with my invention.

Figures 11 and 12 show a ring type of filament, in which the incandescent filament 54 is a circle located in a horizontal plane transverse to the bulb axis for the ordinary use of the bulb, and open at one side, and 56 represents the lead-in wires joining the filament at the terminal portions 55 thereof. The center of radiation of this filament is represented by the point $P^1$, which would be located at the center of the ring if the ring were closed, but which, because of the break therein, is displaced from the center in a direction opposed to the break. $P^2$, is a point located at the middle point of the imaginary line joining the terminal portions 55 of the filament. The importance of the point $P^2$ in relation to determining the location of the reflecting surface will appear hereinafter.

In Figure 13 I have attempted to show a straight line filament 58 intended to be used in a vertically extending position. The center of radiation $P^1$ is at the center of the filament, while the point $P^2$ is located at its lower end 60, where the filament meets the lower lead-in wire 61. At its upper end 62, the filament is connected to the lead-in wire 63, which passes along one side of it into the base.

In Figures 14 and 15, a third type of filament is shown. This type, which may be referred to as the V-type, comprises four angularly related straight-line sections, which are arranged so as to form, as shown in Figure 14, two inverted V's, joined to each other at one side, and each joined at its free end to a lead-in wire 65. The V's are located in angularly related planes as clearly appears from Figure 14. The inner leg of each V is denoted by 70, the outer one by 68 and the terminals of the filament, or the points where it joins the lead-in wires are denoted by 66.

It will further be observed that the portions 70, 70, also form a V. The point $P^1$ of this filament, that is, the center of radiation is readily determined by the rules for finding the center of gravity of the portions 68, 70 considered as lines having a uniform mass distribution along their length. Without going into detail, it may be stated that it will obviously lie in the vertical plane of symmetry of the filament, that is, the plane that passes through the meeting point of 70 and 70 and intermediate the two inverted V's 68, 70 and 68, 70, and as to height and lateral spacing will be located approximately as shown in the drawings, that is, approximately midway in height and lateral spacing. The point $P^2$ is found at the midpoint of a line joining the two filament terminals 66.

Reference is now made to Figure 16 for a detailed disclosure of the geometrical construction involved in the location of the lower edge of the reflecting area of a bulb adapted to be burned in the base down position. This lower edge is determined by a plane X inclined to the horizontal at an angle of substantially ten degrees, or stated in another way, at an angle of eighty degrees to the longitudinal axis of symmetry of the bulb. It is indicated in Figure 16 by the line 72, which is the line in which said plane cuts the paper. The inclined plane will at the same time be perpendicular to the plane of the paper. The point $P^3$ at which the line 72 intersects the surface of bulb 74 will represent the highest point of the lower edge of the reflecting surface, and the point $P^4$, its other point of intersection with the bulb surface, will represent the lowest point.

$P^1$ in Figure 16 represents the center of radiation of the bulb also located in the plane of the paper. As shown in Figure 16 it is located to one side of the vertical axis of the bulb, and to that side which contains the point P⁴. The dotted line 74 represents the outline of the filament, and the point P², the location of which has been hereinabove described for the filaments of Figures 11 to 15, is, for filaments of those types, located in the plane of the paper, and touches the line 72. It will therefore be observed that the point P² represents the extreme limit of the filament downwardly in relation to the inclined plane X of which 72 is the intersection or trace in the plane of the paper, that is, the point P² is such a point that when it lies in the plane X, no part of the filament lies below the plane X, while portions of the filament just touch plane X. It follows that plane X is tangent to the light tore emitted by the filament since light rays from P² will lie in the plane X, while rays from all other points will lie on the lower side of plane X. The direct rays from any point of the filament will be in the form of a conical beam having its vertex at the point and determined by the lower edge of the reflecting surface, and in particular by points P³ and P⁴.

In locating the point P³, representing the high point of the lower edge of the reflecting surface the position of the lead in wires must be considered, it being desirable not to have these located, as far as possible, between the reflecting surface and any point of the filament, because of their great obstructive effects in this position, but rather to have them located in the space intermediate the point P¹ and point P³.

The point P¹, is located to the side of the vertical axis containing the point P⁴. In this way the formation of an undesirable focal point or area between point P¹, and the left hand or greater side of the reflecting area is avoided and a more desirable light distribution is obtained.

Summing up these various considerations, the actual procedure in locating the plane X would therefore be approximately as follows:

(1) Locate points P¹ and P². Where the filament is of a type different from those shown in Figures 11 to 15, the location of these points will readily suggest themselves from what has been said. These points should be located substantially in the same plane with the vertical axis of the bulb. If they are not, the bulb must be manipulated until such is the case. The point P¹ must further be displaced from the vertical axis for the purpose hereinbefore mentioned, and in the case of the filament of Figure 13, to avoid reflection of the rays back into the filament.

(2) Pass a plane through P¹ perpendicular to the aforementioned vertical plane, and inclined to the horizontal at an angle of substantially ten degrees and so that the lowest point of its intersection with the bulb lies on the same side of the bulb axis as the point P¹. The lead-in wires should be arranged so as to offer the minimum obstruction to the passage of light from the filament to the reflecting surface, as has already been mentioned. The bulk of such lead-in wires should therefore be positioned intermediate P¹, and the high spot P³ of the plane. For instance, referring to Figure 11, the plane X would slope upward toward the right of the figure, so that the lead-in wires at no point thereof would be between rays passing from P¹ to the reflecting surface.

(3) Having determined the inclined plane passing through P¹, a plane is drawn parallel thereto and passing through point P². This will be the plane X, previously mentioned, which by its intersection with the bulb surface, determines the lower edge of the bulb.

In Figure 17 I have shown the location of the upper edge of the reflecting surface of a bulb of the base-down type, similar to the one shown in Figure 16. I have found a satisfactory construction to be that in which a horizontal plane Y is passed through the bulb. The upper edge of the reflecting surface will then be a circle subtending an angle of substantially 60° at the center 28 of the spherical surface of the bulb.

A second embodiment of my invention is shown in Figure 18. In this case the bulb is intended for use in the base up position. The plane X¹, corresponding to X of Figure 16, with points P³ and P⁴ is determined as explained in connection with Figure 16. The construction differs from that of Figure 16, mainly in the location of a portion of the reflecting surface on the conical portion 32 of the bulb surface, whereas in the form of Figure 16 the reflecting surface is confined entirely or almost entirely to the spherical portion 30 of the bulb surface. This necessitates a slight change in the location of the upper edge of the reflecting surface, as determined by the plane Y¹, which will be passed horizontally somewhat below the juncture of the conical portion of the bulb with the neck portion so that the circle defined thereby on the bulb surface will subtend an angle of substantially 45° at the center 28 of the spherical portion of the bulb.

It will be observed that all of the hereinabove described embodiments have the characteristic of being adapted for the efficient asymmetric illumination of horizontal areas. Simplicity of construction, and low first and maintenance costs are coupled with effective light distribution and the elimination of light loss, as far as practical, and with unimpaired life of the lighting unit. While it is possible to more fully develop any one of these features, such gain is possible only at the expense of a corresponding loss in other directions. The great advantages of my construction lie in the balance that is attained, whereby an all-around practical and efficient unit results, that may be effectively utilized for the adequate illumination of non-circular areas, such as gasoline filling stations.

It will be understood that the specific embodiments herein disclosed are illustrative only, and that many other embodiments of my invention may be devised, without departing from the spirit of the invention as defined in the appended claims, as will be obvious to those skilled in the art.

Having thus described my invention and illustrated its use, what I claim as new and desire to secure by Letters Patent, is:

1. An incandescent bulb for the asymmetrical illumination of a substantially plane area positioned below the bulb, when said bulb is used alone, and without the aid of extraneous light reflecting devices and with its longitudinal axis in a position substantially perpendicular to said area, said bulb having a transparent casing provided with a spherical portion and a neck portion, a single incandescible filament positioned within said spherical portion with its center of radiation slightly offset from the center of curvature of said spherical portion, lead-in connections for supplying electric current to said filament, an inwardly-reflecting coating on the spherical portion of said casing, said coating being bounded on one side by a plane positioned between the filament and the surface to be illuminated, and at an angle of substantially eighty degrees to the longitudinal axis of said bulb, and said plane touching but not intersecting said filament, and the light rays that fall on the surface to be illuminated proceeding either directly from the filament to said surface, or from the filament to said reflecting surface, and after reflection therefrom directly to the surface to be illuminated.

2. An incandescent bulb for the asymmetrical illumination of a substantially plane area positioned below the bulb when said bulb is used alone, and without the aid of extraneous light reflecting devices, and with its longitudinal axis in a position substantially perpendicular to said area, said bulb having a transparent casing provided with a spherical portion and a neck portion having a base for effecting connection of the bulb with a source of electric current, a single incandescible filament positioned within said spherical portion with its center of radiation slightly offset from the center of curvature of said spherical portion, lead-in wires each connected at one end to the base and at its other end to one of the ends of said filament, an inwardly-reflecting coating on the spherical portion of said casing, said coating being bounded on one side by a plane positioned between the filament and the surface to be illuminated, and at an angle of substantially eighty degrees to the longitudinal axis of said bulb, and said plane touching but not intersecting said filament, and said reflecting medium being bounded at its other side by a plane perpendicular to the longitudinal axis of the bulb, and the light rays that fall on the surface to be illuminated proceeding either directly from the filament to said surface, or from the filament to said reflecting surface, and after reflection therefrom directly to the surface to be illuminated.

3. An incandescent bulb for the asymmetrical illumination of a substantially plane area positioned below the bulb, when said bulb is used alone, and without the aid of extraneous light reflecting devices and with its longitudinal axis in a position substantially perpendicular to said area, said bulb having a transparent casing provided with a spherical portion and a neck portion having a base for effecting connection of the bulb with a source of electric current, an incandescible filament positioned within said spherical portion with its center of radiation slightly offset from the center of curvature of said spherical portion, lead-in wires each connected at one end to the base and at its other end to one of the ends of said filament, an inwardly-reflecting coating on the spherical portion of said casing, said coating being bounded on one side by a plane positioned between the filament and the surface to be illuminated, and at an angle of substantially eighty degrees to the longitudinal axis of said bulb, and said plane touching but not intersecting said filament, and said reflecting medium being bounded at its other side by a plane perpendicular to the longitudinal axis of the bulb and its cut on the reflecting surface subtending an angle of substantially 60° at the center of the spherical portion of the bulb.

4. An incandescent bulb for the asymmetrical illumination of a substantially plane area positioned below the bulb, when said bulb is used alone, and without the aid of extraneous light reflecting devices, and with its longitudinal axis in a position substantially perpendicular to said area, said bulb having a transparent casing provided with a spherical portion and a neck portion, an incandescible filament positioned within said spherical portion with its center of radiation slightly offset from the center of curvature of said spherical portion, lead-in connections for supplying electric current to said filament, an inwardly reflecting coating on the spherical portion of said casing, said coating being bounded on one side by a plane positioned between the filament and the surface to be illuminated, and at an angle of substantially eighty degrees to the longitudinal axis of said bulb, and said plane touching but not intersecting said filament, and said filament being in the form of an open ring having its plane disposed substantially perpendicularly to the longitudinal axis of the bulb and with its terminal points touching said angularly positioned plane.

5. An incandescent bulb for the asymmetrical illumination of a substantially plane area when said bulb is used alone, and without the aid of extraneous light reflecting devices and with its longitudinal axis in a position substantially perpendicular to said area, said bulb having a transparent casing provided with a spherical portion and a neck portion, an incandescible filament positioned within said spherical portion with its center of radiation slightly offset from the center of curvature of said spherical portion, lead-in connections for supplying electric current to said filament, an inwardly-reflecting coating on the spherical portion of said casing, said coating being bounded on one side by a plane positioned between the filament and the surface to be illuminated, and at an angle of substantially eighty degrees to the longitudinal axis of said bulb, and said plane touching but not intersecting said filament, and said filament being in the form of an open ring having its plane disposed substantially perpendicularly to the longitudinal axis of the bulb and with its terminal points touching said angularly positioned plane, and said reflecting medium being bounded at its other side by a plane perpendicular to the longitudinal axis of the bulb.

6. An incandescent bulb for the asymmetrical illumination of a substantially plane area, when said bulb is used alone, and without the aid of extraneous light reflecting devices and with its longitudinal axis in a position substantially perpendicular to said area, said bulb having a transparent casing provided with a spherical portion and a neck portion having a base for effecting connection of the bulb with a source of electric current, an incandescible filament positioned within said spherical portion with its center of radiation slightly offset from the center of curvature of said spherical portion, lead-in wires each connected at one end to the base and at its other end to one of the ends of said filament, an inwardly-reflecting coating on the spherical portion of said casing, said coating being bounded on one side by a plane positioned between the filament and the surface to be illuminated, and at an angle of substantially eighty degrees to the longitudinal axis of said bulb, and said plane touching but not intersecting said filament, and said reflecting medium being bounded at its other side by a plane perpendicular to the longitudinal axis of the bulb and subtending an angle of substantially 60° at the center of the spherical portion of the bulb, and said filament being in the form of an open ring having its plane disposed substantially perpendicularly to the longitudinal axis of the bulb and with its terminal points touching said angularly positioned plane.

7. An incandescent bulb for the asymmetrical illumination of a substantially plane area positioned below the bulb, when said bulb is used alone, and without the aid of extraneous light reflecting devices and with its longitudinal axis in a position substantially perpendicular to said area, said bulb having a transparent casing provided with a spherical portion and a neck portion, an incandescible filament positioned within said spherical portion with its center of radiation slightly offset from the center of curvature of said spherical portion, lead-in connections for supplying electric current to said filament, an inwardly-reflecting coating on the spherical portion of said casing, said coating being bounded on one side by a plane positioned between the filament and the surface to be illuminated, and at an angle of substantially eighty degrees to the longitudinal axis of said bulb, and said plane touching but not intersecting said filament, and said filament being in the form of a straight line parallel in direction to the longitudinal axis of the bulb, and with one terminal point touching said angularly positioned plane.

8. An incandescent bulb for the asymmetrical illumination of a substantially plane area positioned below the bulb, when said bulb is used alone, and without the aid of extraneous light reflecting devices and with its longitudinal axis in a position substantially perpendicular to said area, said bulb having a transparent casing provided with a spherical portion and a neck portion, an incandescible filament positioned within said spherical portion with its center of radiation slightly offset from the center of curvature of said spherical portion, lead-in connections for supplying electric current to said filament, an inwardly-reflecting coating on the spherical portion of said casing, said coating being bounded on one side by a plane positioned between the filament and the surface to be illuminated, and at an angle of substantially eighty degrees to the longitudinal axis of said bulb, and said plane touching but not intersecting said filament, and said filament being in the form of a straight line, parallel in direction to the longitudinal axis of the bulb, and with one terminal point touching said angularly positioned plane, and said reflecting medium being bounded at its other side by a plane perpendicular to the longitudinal axis of the bulb.

9. An incandescent bulb for the asymmetrical illumination of a substantially plane area positioned below the bulb, when said bulb is used alone, and without the aid of extraneous light reflecting devices and with its longitudinal axis in a position substantially perpendicular to said area, said bulb having a transparent casing provided with a spherical portion and a neck portion provided with a base for effecting connection of the bulb with a source of electric current, an incandescible filament positioned within said spherical portion with its center of radiation slightly offset from the center of curvature of said spherical portion, lead-in wires each connected at one end to the base and at its other end to one of the ends of said filament, an inwardly-reflecting coating on the spherical portion of said casing, said coating being bounded on one side thereof by a plane positioned between the filament and the surface to be illuminated, and at an angle of substantially eighty degrees to the longitudinal axis of said bulb, and said plane touching but not intersecting said filament, and said reflecting medium being bounded at its other side by a plane perpendicular to the longitudinal axis of the bulb and subtending an angle of substantially 60° at the center of the spherical portion of the bulb and said filament being in the form of a straight line parallel in direction to the longitudinal axis of the bulb, and with one terminal point touching said angularly positioned plane.

10. An incandescent bulb for the asymmetrical illumination of a substantially plane area positioned below the bulb, when said bulb is used alone, and without the aid of extraneous light reflecting devices and with its longitudinal axis in a position substantially perpendicular to said area, said bulb having a transparent casing provided with a spherical portion and a neck portion, an incandescible filament positioned within said spherical portion with its center of radiation slightly offset from the center of curvature of said spherical portion, lead-in connections for supplying electric current to said filament, an inwardly-reflecting coating on the spherical portion of said casing, said coating being bounded on one side thereof by a plane positioned between the filament and the surface to be illuminated, and at an angle of substantially eighty degrees to the longitudinal axis of said bulb, and said plane touching but not intersecting said filament, and said filament being in the form of two V's each having one leg shorter than the other and the free ends of the short legs of the V's meeting at a point, and the ends of the free terminal portions of the long legs of the V's constituting the end portions of the filament and touching said angularly positioned plane.

11. An incandescent bulb for the asymmetrical illumination of a substantially plane area positioned below the bulb, when said bulb is used alone, and without the aid of extraneous light reflecting devices and with its longitudinal axis in a position substantially perpendicular to said area, said bulb having a transparent casing provided with a spherical portion and a neck portion, an incandescible filament positioned within said spherical portion with its center of radiation slightly offset from the center of curvature of said spherical portion, lead-in connections for supplying electric current to said filament, an inwardly-reflecting coating on the spherical portion of said casing, said coating being bounded on one side by a plane positioned between the filament and the surface to be illuminated, and at an angle of substantially eighty degrees to the longitudinal axis of said bulb, and said plane touching but not intersecting said filament, and said filament being in the form of two V's each having one leg shorter than the other and the free ends of the short legs of the V's meeting at a point, and the ends of the free terminal portions of the long legs of the V's constituting the end portions of the filament and touching said angularly positioned plane, and said reflecting medium being bounded at its other side by a plane perpendicular to the longitudinal axis of the bulb.

12. An incandescent bulb for the asymmetrical illumination of a substantially plane area positioned below the bulb, when said bulb is used alone, and without the aid of extraneous light reflecting devices and with its longitudinal axis in a position substantially perpendicular to said area, said bulb having a transparent casing provided with a spherical portion and a neck portion provided with a base for effecting connection of the bulb with a source of electric current, an incandescible filament positioned within said spherical portion with its center of radiation slightly offset from the center of curvature of said spherical portion, lead-in wires each connected at one end to the base and at its other end to one of the ends of said filament, an inwardly-reflecting coating on the spherical portion of said casing, said coating being bounded on one side by a plane positioned between the filament and the surface to be illuminated, and at an angle of substantially eighty degrees to the longitudinal axis of said bulb, and said plane touching but not intersecting said filament, and said reflecting medium being bounded at its other side by a plane perpendicular to the longitudinal axis of the bulb and subtending an angle of substantially 60° at the center of the spherical portion of the bulb, and said filament being in the form of two V's each having one leg shorter than the other and the free ends of the short legs of the V's meeting at a point, and the ends of the free terminal portions of the long legs of the V's constituting the end portions of the filament and touching said angularly positioned plane.

13. In the manufacture of an asymmetric lighting unit having an incandescent filament surrounded by a pear-shaped casing of transparent material, and areas of said casing being rendered opaque and light-reflecting by the placing of opaque light-reflective material thereon, and in which portions of said reflecting area are approximately spherical and in which all portions of said filament are asymmetrically located with reference to said reflecting area, and said reflecting area being positioned so as to asymmetrically augment the light flux passing directly outward and to prevent its passage through said light-reflecting area, the method of determining one boundary of said reflecting area which comprises the steps of displacing the center of radiation of the filament to one side of the longitudinal axis of symmetry of the casing and locating a plane through the center of radiation and through said axis, thereafter locating a second plane passing through said center of radiation and perpendicular to said first-mentioned plane and inclined approximately eighty degrees to the axis of symmetry, the direction of inclination being determined by having the plane slope so that the point at which it cuts the nearest portions of the reflecting area is nearest to the base of the lamp, and locating a third plane parallel to said first inclined plane, through the casing and to the side of the filament nearest the base of the lamp, and so as to touch but not to intersect the filament, and limiting the reflecting area by the intersection of said third plane with the casing, by removing the reflecting material on the side of the third plane remote from said filament.

14. In the manufacture of an asymmetric lighting unit having an incandescent filament surrounded by a pear-shaped casing of transparent material, and areas of said casing being rendered opaque and light-reflecting by the placing of opaque light-reflective material thereon, and in which portions of said reflecting area are approximately spherical and in which all portions of said filament are asymmetrically located with reference to said reflecting area, and said reflecting area being positioned so as to asymmetrically augment the light flux passing directly outward and to prevent its passage through said light-reflecting area, the method of determining one boundary of said reflecting area which comprises the steps of locating a plane through the center of radiation and through said axis, thereafter locating a second plane passing through said center of radiation and perpendicular to said first-mentioned plane and inclined approximately eighty degrees to the axis of symmetry, the direction of inclination being determined by having the plane slope so that the point at which it cuts the nearest portions of the reflecting area is nearest to the base of the lamp, and locating a third plane parallel to said first inclined plane, through the casing and to the side of the filament nearest the base of the lamp, and so as to touch but not to intersect the filament, and limiting the reflecting area by the intersection of said third plane with the casing, by removing the reflecting material on the side of the third plane remote from said filament.

JOHN D. WHITTAKER.